US008181039B2

(12) United States Patent
Umeno

(10) Patent No.: US 8,181,039 B2
(45) Date of Patent: May 15, 2012

(54) DISC DRIVE COUNTERFEITING COUNTERMEASURE

(75) Inventor: Hiroo Umeno, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1110 days.

(21) Appl. No.: 11/735,166

(22) Filed: Apr. 13, 2007

(65) Prior Publication Data

US 2008/0256369 A1    Oct. 16, 2008

(51) Int. Cl.
*G06F 21/00* (2006.01)
(52) U.S. Cl. .......................................... 713/193; 380/44
(58) Field of Classification Search .................... 726/26, 726/30, 28, 29, 32, 33; 713/187, 190, 193, 713/194; 380/44–47
See application file for complete search history.

(56) References Cited

U.S. PATENT DOCUMENTS

| | | | | |
|---|---|---|---|---|
| 5,892,899 A | 4/1999 | Aucsmith et al. | ............ | 395/186 |
| 6,668,325 B1 | 12/2003 | Collberg et al. | ............ | 713/194 |
| 6,694,435 B2 | 2/2004 | Kiddy | ............ | 713/189 |
| 7,065,652 B1 | 6/2006 | Xu et al. | ............ | 713/190 |
| 2003/0110382 A1* | 6/2003 | Leporini et al. | ............ | 713/172 |
| 2003/0191938 A1 | 10/2003 | Woods et al. | ............ | 713/165 |
| 2005/0019017 A1 | 1/2005 | Green | ............ | 386/95 |
| 2005/0216611 A1 | 9/2005 | Martinez | ............ | 710/22 |
| 2006/0177061 A1* | 8/2006 | Orsini et al. | ............ | 380/268 |
| 2006/0195703 A1 | 8/2006 | Jakubowski | ............ | 713/190 |
| 2006/0218539 A1 | 9/2006 | Stiemens et al. | ............ | 717/140 |
| 2007/0039048 A1 | 2/2007 | Shelest et al. | ............ | 726/22 |

OTHER PUBLICATIONS

Chang, H. et al., "Protecting Software Codes by Guards", Cerias Tech Report, 2001-49, 15 pages, http://www.cerias.prudue.edu.
Sethi, A., "Digital Rights Management and Code Obfuscation", Thesis presented to the University of Waterloo, Waterloo, Ontario, Canada, 2003, 98 pages, http://etd.uwaterloo.ca.
"Content Protection for Optical Media", A Comparison of Self-Protecting Digital Content and AACA, May 3, 2005, http://securityevaluators.com, 31 pages.

* cited by examiner

*Primary Examiner* — Edward Zee
(74) *Attorney, Agent, or Firm* — Woodcock Washburn LLP

(57) ABSTRACT

Counterfeiting of optical disc drives used with game systems is prevented by storing an obfuscated authentication key in firmware of the disc drive. Each disc drive can implement a different obfuscation scheme. The authentication key is parsed into components and the components are stored in various locations in firmware of the disc drive. Drive specific software also is stored in the firmware. Remaining locations of the firmware are randomly populated with binary values.

19 Claims, 7 Drawing Sheets

DISC DRIVE COUNTERFEITING COUNTERMEASURE

TECHNICAL FIELD

The technical field relates generally to computer processing and more specifically to computer processing security.

BACKGROUND

A typical disc drive, such as an XBOX® 360 Optical Disc Drive (ODD) utilizes a unique software key to authenticate the disc drive against a processor, such as a game console (e.g., XBOX® 360 game console). The unique key is stored in memory on the disc drive. A known method of defeating this authentication scheme includes harvesting the unique key from an authentic disc drive. The firmware (software embedded on a hardware device) of another disc drive is modified by inserting the unique key into the firmware of the other disc drive. When the modified disc drive is used with the processor (e.g., game console), the processor determines that the disc drive is authentic.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

To deter counterfeiting of disc drives, disc drives are generated having obfuscated authentication keys. The obfuscation scheme is not necessarily the same for all disc drives. The authentication key is parsed into components. The components are stored in various locations in memory of the disc drive. Disc drive specific software also is stored in the memory. Remaining locations of the disc drive memory are randomly populated with logical ones and zeros.

BRIEF DESCRIPTION OF THE DRAWINGS

The foregoing summary, as well as the following detailed description, is better understood when read in conjunction with the appended drawings. For the purpose of illustrating countermeasures for preventing disc drive counterfeiting, there is shown in the drawings exemplary constructions thereof; however, countermeasures for preventing disc drive counterfeiting is not limited to the specific methods and instrumentalities disclosed.

DETAILED DESCRIPTION OF ILLUSTRATIVE EMBODIMENTS

In an example embodiment, a storage drive, such as an optical disc drive, comprises firmware containing an obfuscated authentication key. Firmware, as described herein comprises software embedded in a hardware device such as read only memory (ROM), flash memory, random access memory (RAM), or the like. The software includes the obfuscated authentication key and drive specific software. The remainder of the firmware is populated with random values, such as logical ones and zeros. Drive specific software can include any appropriate software utilized by the drive to access a storage medium and/or to interface with a processor. The authentication key can comprise any appropriate key used to authenticate the disc drive. For example, the authentication key can comprise a cryptographic key, a random number, or the like. An authentication key is obfuscated by parsing the authentication key into several components and storing the parsed components in various locations in the memory of the disc drive. The authentication key in each drive can be obfuscated differently. Thus, each disc drive can have the portions of the authentication key stored in different locations.

Figure 1:
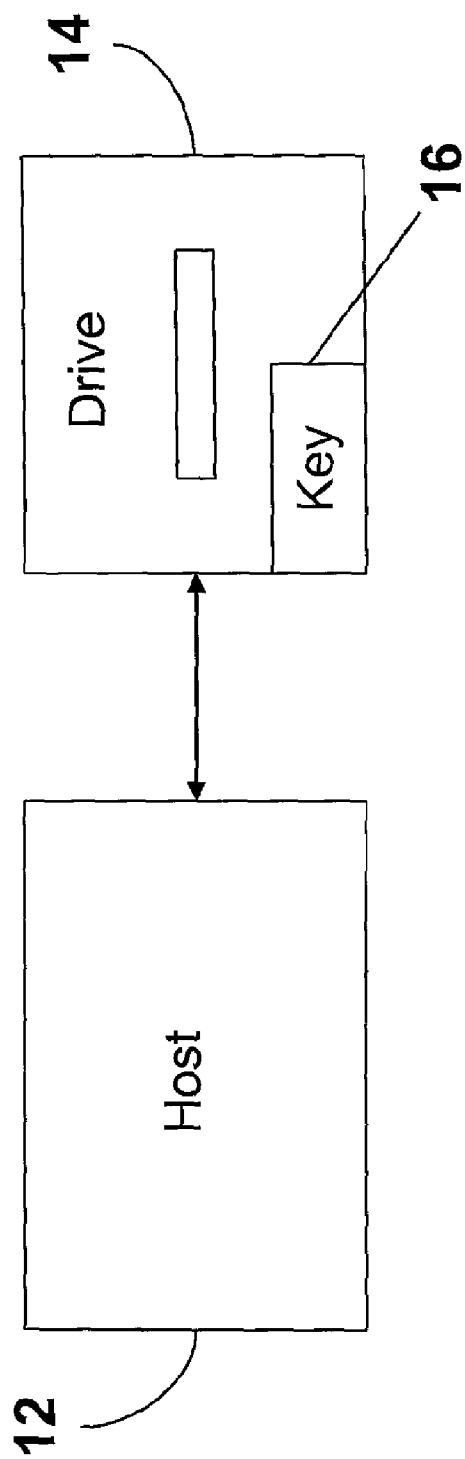
FIG. 1 is a block diagram of an example host processor, disc drive, and firmware.

FIG. 1 is a block diagram of an example host processor 12 and disc drive 14. The drive 14 comprises firmware 16 that comprises an obfuscated key. The host processor 12 can comprise any appropriate processor that is configured to interface with a storage drive 14. An example host processor 12 includes, but is not limited to, a general purpose processor, a desk top computer, a server, a portable entertainment device, a portable media player, e.g., a portable music player, such as an MP3 player, a walkmans, etc., a portable computing device, such as a laptop, a personal digital assistant ("PDA"), a portable phone, such as a cell phone or the like, a smart phone, a video phone, a portable email device, a thin client, a portable gaming device, etc., consumer electronic devices, such as TVs, DVD players, set top boxes, monitors, displays, etc., a public computing device, such as a kiosk, an in-store music sampling device, an automated teller machine (ATM), a cash register, etc., a navigation device whether portable or installed in-vehicle, a non-conventional computing device, such as a kitchen appliance, a motor vehicle control (e.g., steering wheel), etc., or a combination thereof.

The storage drive 14 can comprise any appropriate storage drive configured to access the storage medium 16. Accessing the storage medium 16 includes reading information from the storage medium 16, writing information to the storage medium 16, erasing information from the storage medium 16, or a combination thereof. An example storage derive 14 can include, but is not limited to, a general purpose processor, a desk top computer, a server, a portable entertainment device, a portable media player, e.g., a portable music player, such as an MP3 player, a walkmans, etc., a portable computing device, such as a laptop, a personal digital assistant ("PDA"), a portable phone, such as a cell phone or the like, a smart phone, a video phone, a portable email device, a thin client, a portable gaming device, etc., consumer electronic devices, such as TVs, DVD players, set top boxes, monitors, displays, etc., a public computing device, such as a kiosk, an in-store music sampling device, an automated teller machine (ATM), a cash register, etc., a navigation device whether portable or installed in-vehicle, a non-conventional computing device, such as a kitchen appliance, a motor vehicle control (e.g., steering wheel), etc., or a combination thereof.

The host processor 12 and the storage drive 14 can be implemented in various configurations. In various example configurations, the host processor 12 and the storage drive 14 are the same processor, the host processor 12 and the storage drive 14 are separate processors, or a combination thereof. For example, the host processor 12 and the storage drive 14 can be implemented in a game console or in a personal computer.

Figure 2:
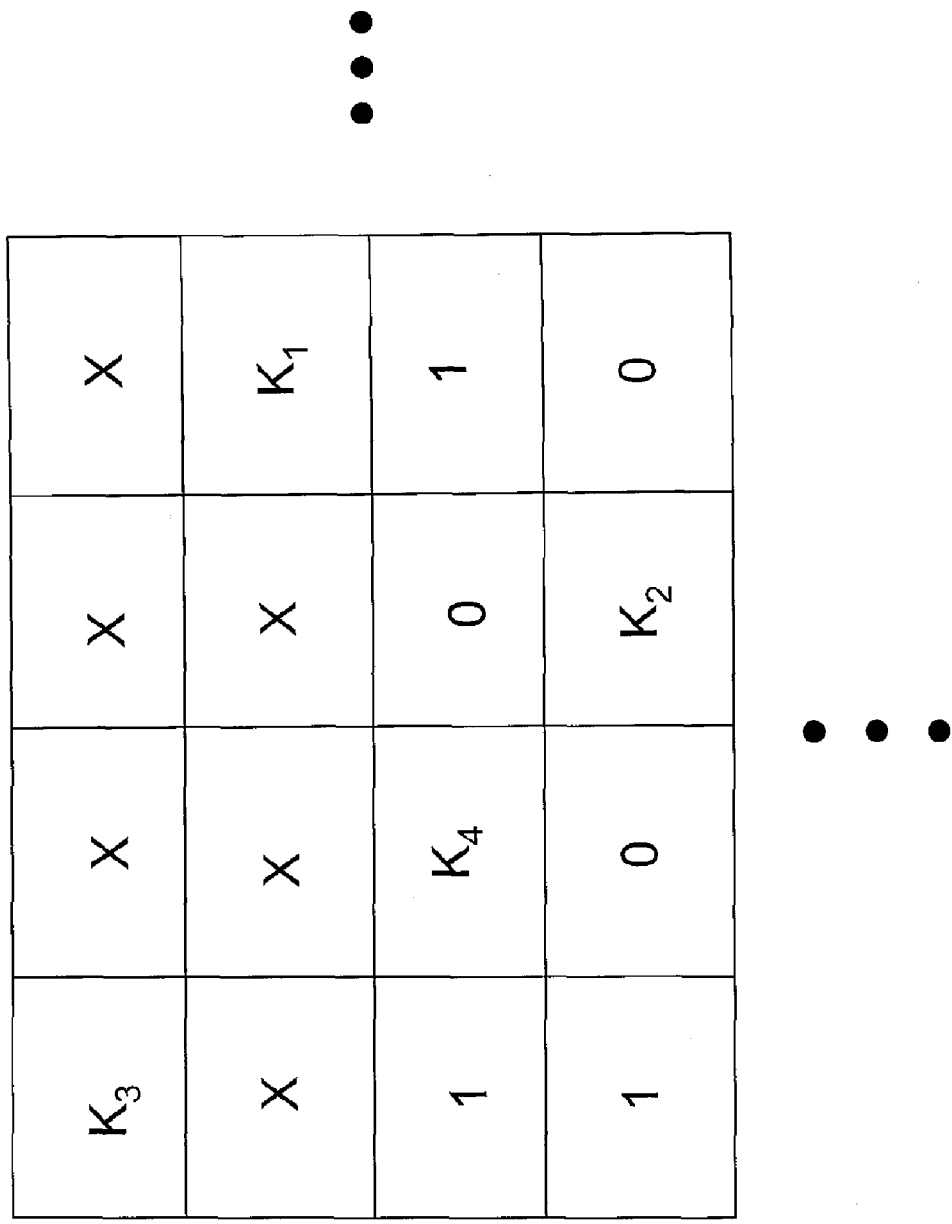
FIG. 2 is depiction of example contents of the firmware.

FIG. 2 is depiction of example contents of the firmware 16. Each letter "K" represents a parsed component of the authentication key. The letter "X" represents drive software, and the 1's and 0's represent randomly populated values. As depicted in FIG. 2, the authentication key comprises four parsed components, $K_1$, $K_2$, $K_3$, and $K_4$. Each of the parsed components is stored in a different location in the firmware 16. To utilize the authentication key, the components of the authentication stored in the firmware 16 are accessed, and appropriately combined to generate the authentication key. In an example embodiment, the storage drive 14 determines the locations, in the firmware 16, of the components and combines the components of the obfuscated authentication key to form the authentication key. In an example embodiment, the storage drive 14 is programmed (e.g., during manufacture thereof) with the sequence of components needed to form the authentication key from the components obtained from the firmware 16. In this example embodiment, the storage drive 14 also is programmed with the locations of the components of the obfuscated authentication key stored in the firmware 16. The software for implementing this program can be stored in the firmware 16. The software indicating how to combine the components of the obfuscated authentication key and the locations, in the firmware 16, of the components, further can be obfuscated in the firmware 16. Further obfuscating the sequence and location software will help thwart analysis of the storage drive 14 firmware 16 via comparing memory content of the firmware of multiple storage devices.

The drive software, represented by the letters "X", can be stored in any appropriate locations of the firmware 16. The remainder of the firmware 16 is populated with any appropriate values. In an example embodiment, the remainder of the firmware is randomly populated with binary values 1 and 0. Because the authentication key is stored as parsed components, distributed among the drive software and the randomly populated filler (1s and 0s), it is not readily apparent which memory locations correspond to the authentication key. Thus, a hacker or the like would have difficulty determining the what part of dissimilar stored in the firmware corresponds to the authentication key.

Figure 3:
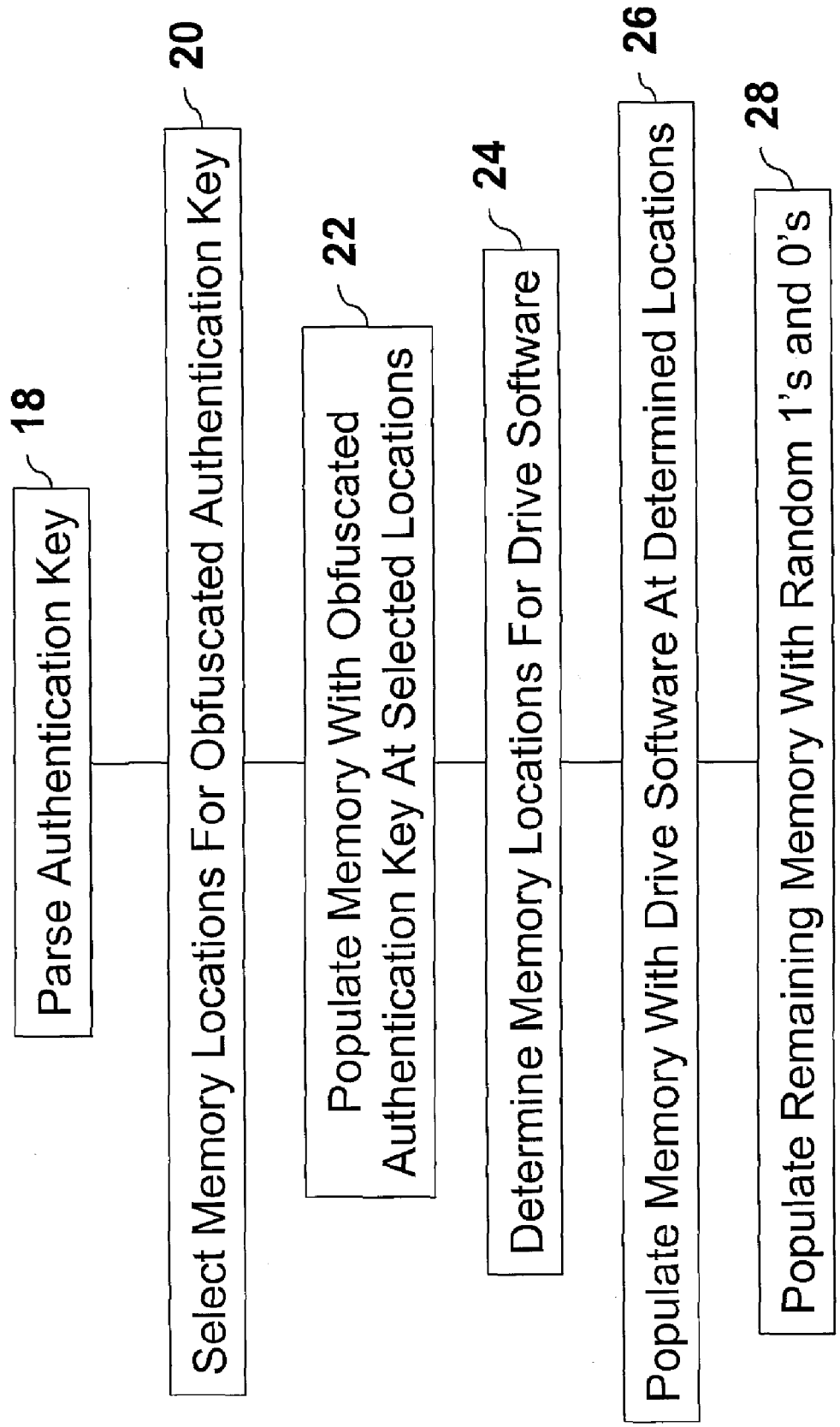
FIG. 3 is a flow diagram of an example process for generating an obfuscated authentication key.

FIG. 3 is a flow diagram of an example process for generating an obfuscated authentication key. The authentication key is parsed into components at step 18. In an example embodiment, the authentication key components can be further obfuscated. For example, each component can be encrypted or the like. Memory locations (e.g., memory locations of the firmware 16) for storing the authentication key components are determined at step 20. The memory locations can be selected in any appropriate manner. For example, the memory locations can be selected via a predetermined algorithm, randomly determined, or the like. At step 22 the components of the authentication key are stored in the selected memory locations. A step 24 it is determined where in the memory the drive software is to be stored. The drive software can be stored in any appropriate location of the drive memory. At step 26, the drive software is stored in the determined locations. At step 28, the remainder of the memory is randomly populated with values such as ones and zeros for example.

Figure 4:
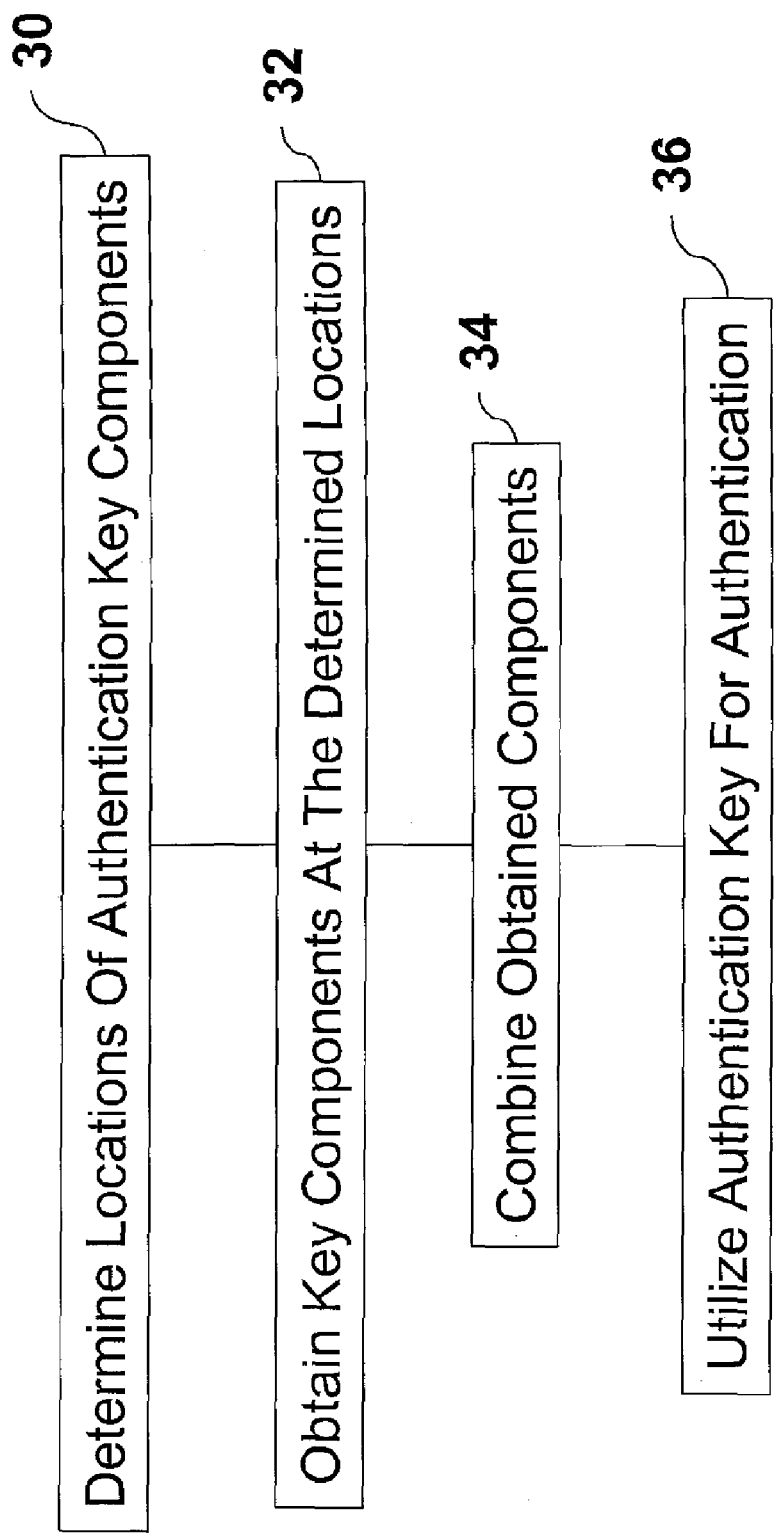
FIG. 4 is a flow diagram of an example process for obtaining the obfuscated authentication key.

FIG. 4 is a flow diagram of an example process for obtaining the obfuscated authentication key. At step 30 the locations of the components of the obfuscated authentication key are determined. These locations can be determined in any appropriate manner in accordance with the scheme utilized to obfuscate and store the authentication key. At step 32 the components of the obfuscated authentication key are obtained at the determined locations. The obtained components are combined at step 34 and the authentication key is utilized to authenticate the disk drive and step 36.

Figure 5:
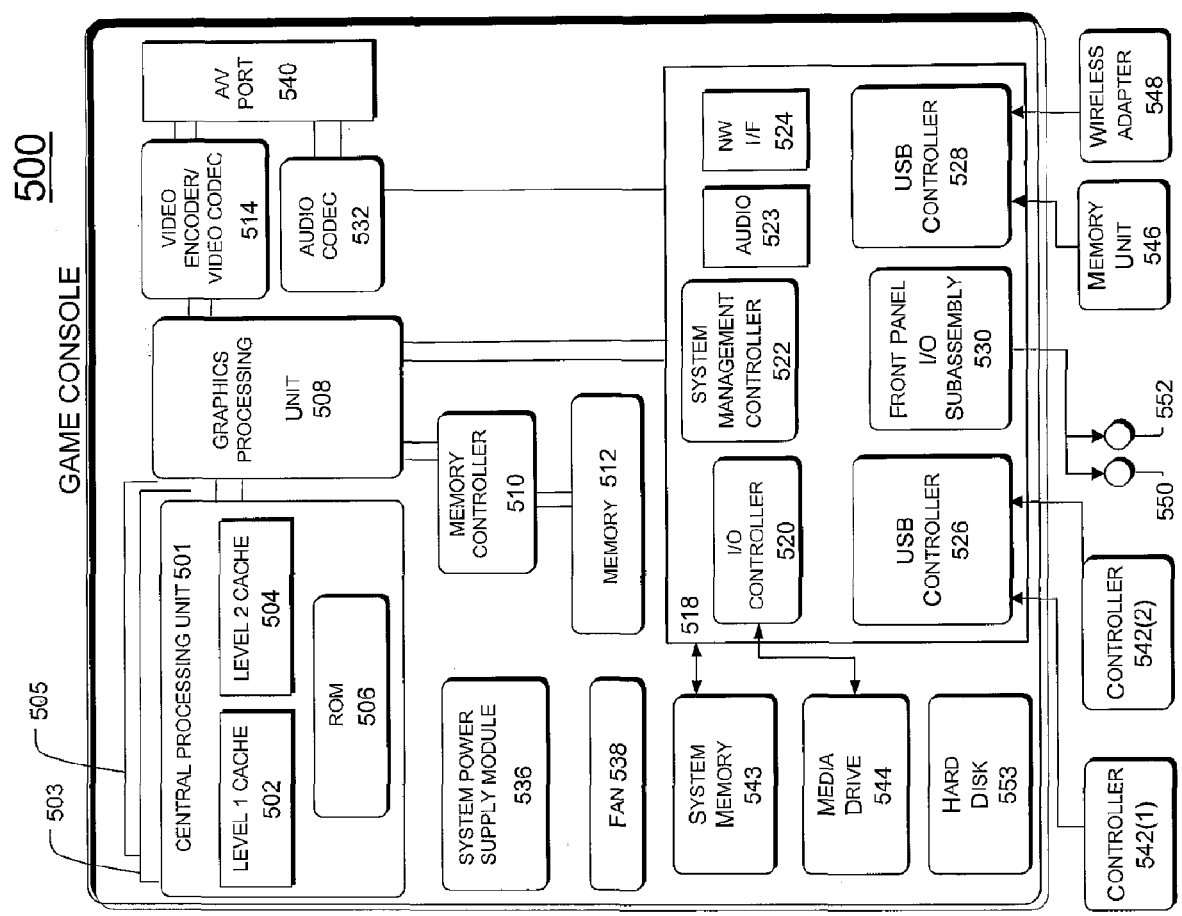
FIG. 5 is a block diagram of an example game console via which countermeasures for preventing disc drive counterfeiting can be implemented.

In an example scenario, the host processor 12 comprises a game console. FIG. 5 is a block diagram of an example game console 500 via which countermeasures for preventing disc drive counterfeiting can be implemented. The game console 500 along with other devices described herein, such as a display device, are capable of performing the functions needed to implement countermeasures for preventing disc drive counterfeiting, as describe above. Game console 500 is an example of a dedicated host system, although, as noted above, a game console is only one example of a dedicated host device. A typical game console comprises hardware and software that are specifically designed to support a core set of usage scenarios.

Game console 500 has a central processing unit (CPU) 501 having a level 1 (L1) cache 502, a level 2 (L2) cache 504, and a flash ROM (Read-only Memory) 506. The level 1 cache 502 and level 2 cache 504 temporarily store data and hence reduce the number of memory access cycles, thereby improving processing speed and throughput. The flash ROM 506 can store executable code that is loaded during an initial phase of a boot process when the game console 500 is initially powered. Alternatively, the executable code that is loaded during the initial boot phase can be stored in a FLASH memory device (not shown). Further, ROM 506 can be located separate from CPU 501. Game console 500 can, optionally, be a multi-processor system; for example game console 500 can have three processors 501, 503, and 505, where processors 503 and 505 have similar or identical components to processor 501.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display device. A memory controller 510 is connected to the GPU 508 and CPU 501 to facilitate processor access to various types of memory 512, such as, but not limited to, a RAM (Random Access Memory).

Game console 500 includes an I/O controller 520, a system management controller 522, an audio processing unit 523, a network interface controller 524, a first USB host controller 526, a second USB controller 528 and a front panel I/O subassembly 530 that may be implemented on a module 518. The USB controllers 526 and 528 serve as hosts for peripheral controllers 542(1)-842(2), a wireless adapter 548, and an external memory unit 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless interface components including an Ethernet card, a modem, a Bluetooth module, a cable modem, and the like.

System memory 543 is provided to store application data that is loaded during the boot process. A media drive 544 is provided and may comprise a DVD/CD drive, hard drive, or other removable media drive, etc. The media drive 544 may be internal or external to the game console 500. When media drive 544 is a drive or reader for removable media (such as removable optical disks, or flash cartridges), then media drive 544 is an example of an interface onto which (or into which) media are mountable for reading. Application data may be accessed via the media drive 544 for execution, playback, etc. by game console 500. Media drive 544 is connected to the I/O controller 520 via a bus, such as a Serial ATA bus or other high speed connection (e.g., IEEE 5394). While media drive 544 may generally refer to various storage embodiments (e.g., hard disk, removable optical disk drive, etc.), game console 500 may specifically include a hard disk 552, which can be used to store game data, application data, or other types of data, and on which the file systems depicted in FIGS. 5 and 4 may be implemented.

The system management controller 522 provides a variety of service functions related to assuring availability of the game console 500. The audio processing unit 523 and an audio codec 532 form a corresponding audio processing pipeline with high fidelity, 5D, surround, and stereo audio processing according to aspects of the present subject matter described herein. Audio data is carried between the audio processing unit 523 and the audio codec 526 via a communication link. The audio processing pipeline outputs data to the A/V port 540 for reproduction by an external audio player or device having audio capabilities.

The front panel I/O subassembly 530 supports the functionality of the power button 550 and the eject button 552, as well as any LEDs (light emitting diodes) or other indicators exposed on the outer surface of the game console 500. A system power supply module 536 provides power to the components of the game console 500. A fan 538 cools the circuitry within the game console 500.

The CPU 501, GPU 508, memory controller 510, and various other components within the game console 500 are interconnected via one or more buses, including serial and parallel buses, a memory bus, a peripheral bus, and a processor or local bus using any of a variety of bus architectures.

When the game console 500 is powered on or rebooted, application data can be loaded from the system memory 543 into memory 512 and/or caches 502, 504 and executed on the CPU 501. The application can present a graphical user interface that provides a consistent user experience when navigating to different media types available on the game console 500. In operation, applications and/or other media contained within the media drive 544 may be launched or played from the media drive 544 to provide additional functionalities to the game console 500.

The game console 500 may be operated as a standalone system by simply connecting the system to a television or other display. In this standalone mode, the game console 500 may allow one or more users to interact with the system, watch movies, listen to music, and the like. However, with the integration of broadband connectivity made available through the network interface 524 or the wireless adapter 548, the game console 500 may further be operated as a participant in a larger network community.

Figure 6:
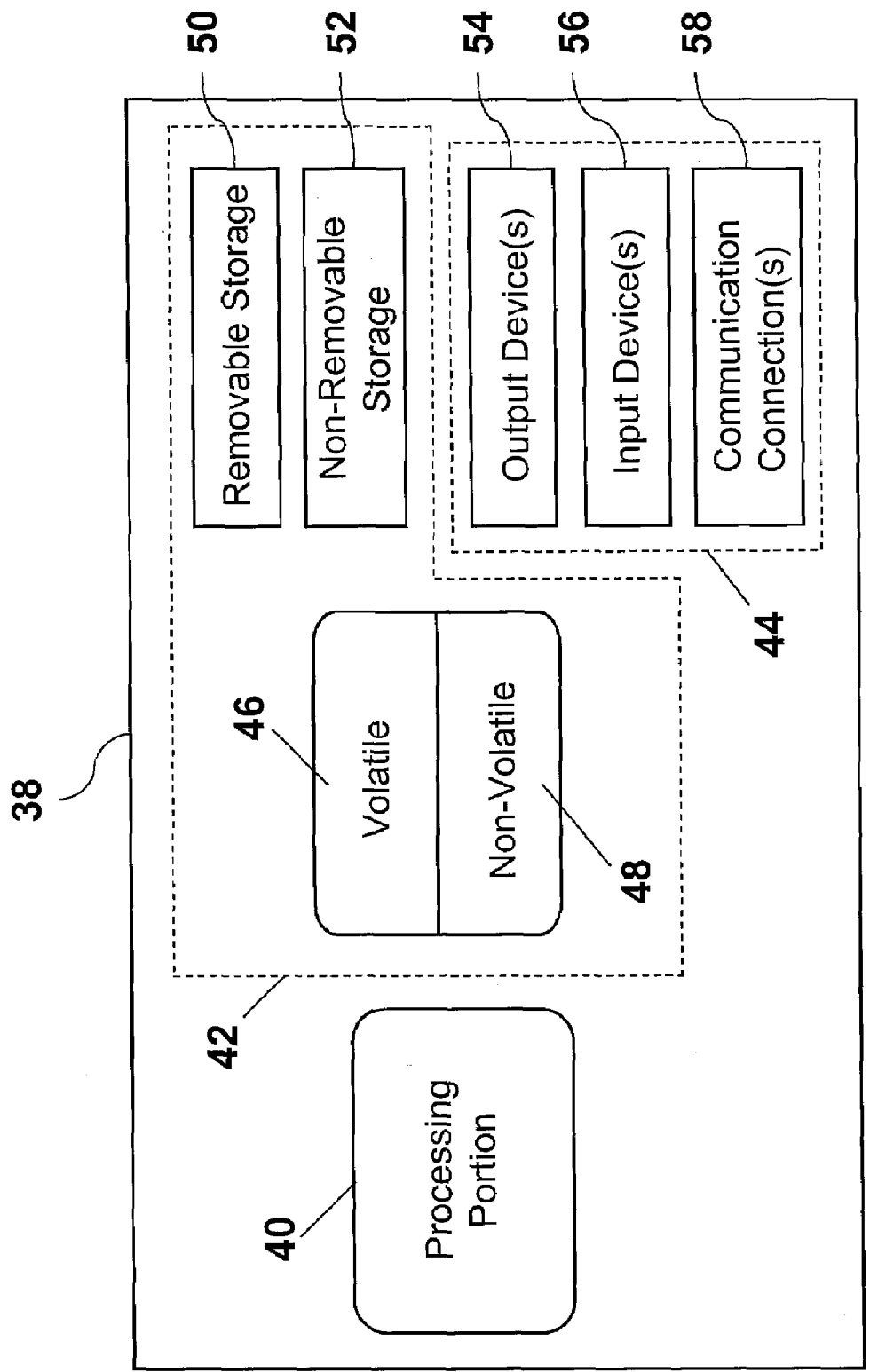
FIG. 6 is a diagram of an exemplary processor for implementing countermeasures for preventing disc drive counterfeiting.

As described above, the host processor 12 can comprise a processor or combination of processors. Also, the storage drive 14 can comprise a processor or combination of processors. FIG. 6 is a diagram of an exemplary processor 38 for implementing countermeasures for preventing disc drive counterfeiting. The processor 38 comprises a processing portion 40, a memory portion 42, and an input/output portion 44. The processing portion 40, memory portion 42, and input/output portion 44 are coupled together (coupling not shown in FIG. 6) to allow communications therebetween. The input/output portion 44 is capable of providing and/or receiving components utilized to perform countermeasures for preventing disc drive counterfeiting as described above. For example, the input/output portion 44 is capable of, as described above, providing and/or receiving components of an authentication key. The memory portion 42 is capable of storing information needed to implement countermeasures for preventing disk drive counterfeiting. For example the memory portion 42 is capable of storing the authentication key, components of a parsed authentication key, drive software, randomly populated values, such as ones and zeros, or a combination thereof.

The processing portion 40 is capable of countermeasures for preventing disc drive counterfeiting as described above. For example, the processing portion 40 is capable of parsing an authentication key, selecting memory locations for storing components of a parsed authentication key, populating memory with components of a parsed authentication key, determining memory locations for storing drive software, storing drive software, populating memory with random values, such as ones and zeros, or a combination thereof. The processing portion 40 also is capable of determining locations in memory of the authentication key components, obtaining the key components from the determined locations, combining obtained components, utilizing the authentication key for authentication of the disk drive, or a combination thereof.

The processor 38 can be implemented as a client processor and/or a server processor. In a basic configuration, the processor 38 can include at least one processing portion 40 and memory portion 42. The memory portion 42 can store any information utilized in conjunction with countermeasures for preventing disc drive counterfeiting. Depending upon the exact configuration and type of processor, the memory portion 42 can be volatile (such as RAM) 46, non-volatile (such as ROM, flash memory, etc.) 48, or a combination thereof. The processor 38 can have additional features/functionality. For example, the processor 38 can include additional storage (removable storage 50 and/or non-removable storage 52) including, but not limited to, magnetic or optical disks, tape, flash, smart cards or a combination thereof. Computer storage media, such as memory portion 42, 46, 48, 50, and 52, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 38. Any such computer storage media can be part of the processor 38.

The processor 38 can also contain communications connection(s) 58 that allow the processor 38 to communicate with other devices, such as other devices, for example. Communications connection(s) 58 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 38 also can have input device(s) 56 such as keyboard, mouse, pen, voice input device, touch input device, etc. Output device(s) 54 such as a display, speakers, printer, etc. also can be included.

Figure 7:
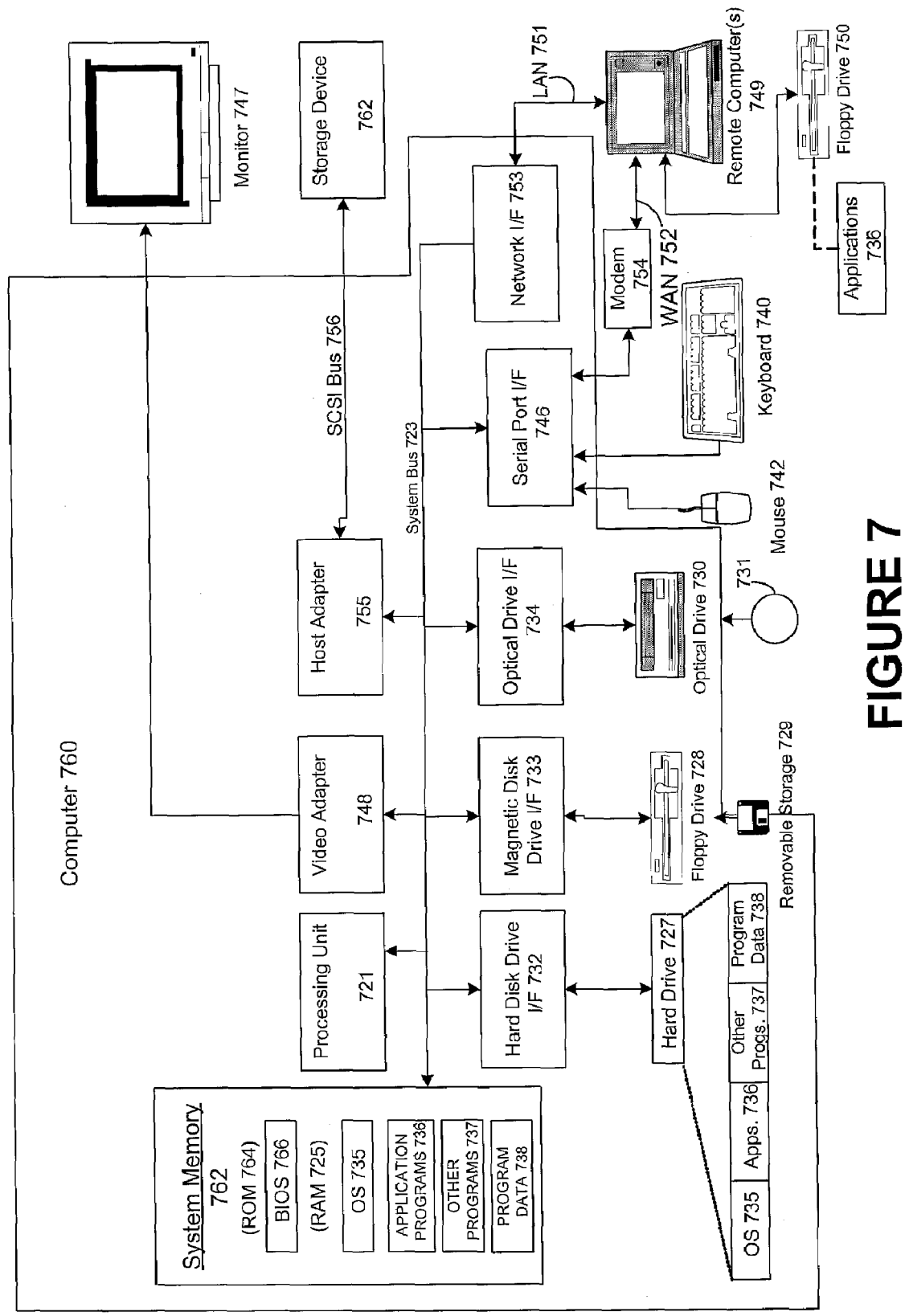
FIG. 7 is a depiction of a suitable computing environment in which countermeasures for preventing disc drive counterfeiting can be implemented.

FIG. 7 and the following discussion provide a brief general description of a suitable computing environment in which countermeasures for preventing disc drive counterfeiting can be implemented. Although not required, various aspects of countermeasures for preventing disc drive counterfeiting can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of countermeasures for preventing disc drive counterfeiting can be practiced with other computer system configurations, including hand held devices, multi processor systems, microprocessor based or programmable consumer electronics, network PCs, minicomputers, mainframe computers, and the like. Further, countermeasures for preventing disc drive counterfeiting also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 721, the memory (both ROM 764 and RAM 725), the basic input/output system (BIOS) 766, and various input/output (I/O) devices such as a keyboard 740, a mouse 762, a monitor 747, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with countermeasures for preventing disc drive counterfeiting as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 7, an exemplary general purpose computing system includes a conventional computing device 760 or the like, including a processing unit 721, a system memory 762, and a system bus 723 that couples various system components including the system memory to the processing unit 721. The system bus 723 may be any of several types of bus structures including a memory bus or memory controller, a peripheral bus, and a local bus using any of a variety of bus architectures. The system memory includes read only memory (ROM) 764 and random access memory (RAM) 725. A basic input/output system 766 (BIOS), containing basic routines that help to transfer information between elements within the computing device 760, such as during start up, is stored in ROM 764. The computing device 760 may further include a hard disk drive 727 for reading from and writing to a hard disk (hard disk not shown), a magnetic disk drive 728 (e.g., floppy drive) for reading from or writing to a removable magnetic disk 729 (e.g., floppy disk, removal storage), and an optical disk drive 730 for reading from or writing to a removable optical disk 731 such as a CD ROM or other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer readable media provide non volatile storage of computer readable instructions, data structures, program modules and other data for the computing device 760. Although the exemplary environment described herein employs a hard disk, a removable magnetic disk 729, and a removable optical disk 731, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 729, optical disk 731, ROM 764, or RAM 725, including an operating system 735, one or more application programs 736, other program modules 737, and program data 738. A user may enter commands and information into the computing device 760 through input devices such as a keyboard 740 and pointing device 762 (e.g., mouse). Other input devices (not shown) may include a microphone, joystick, game pad, satellite disk, scanner, or the like. These and other input devices are often connected to the processing unit 721 through a serial port interface 746 that is coupled to the system bus, but may be connected by other interfaces, such as a parallel port, game port, or universal serial bus (USB). A monitor 747 or other type of display device is also connected to the system bus 723 via an interface, such as a video adapter 748. In addition to the monitor 747, computing devices typically include other peripheral output devices (not shown), such as speakers and printers. The exemplary environment of FIG. 7 also includes a host adapter 755, Small Computer System Interface (SCSI) bus 756, and an external storage device 762 connected to the SCSI bus 756.

The computing device 760 may operate in a networked environment using logical connections to one or more remote computers, such as a remote computer 749. The remote computer 749 may be another computing device (e.g., personal computer), a server, a router, a network PC, a peer device, or other common network node, and typically includes many or all of the elements described above relative to the computing device 760, although only a memory storage device 750 (floppy drive) has been illustrated in FIG. 7. The logical connections depicted in FIG. 7 include a local area network (LAN) 751 and a wide area network (WAN) 752. Such networking environments are commonplace in offices, enterprise wide computer networks, intranets and the Internet.

When used in a LAN networking environment, the computing device 760 is connected to the LAN 751 through a network interface or adapter 753. When used in a WAN networking environment, the computing device 760 can include a modem 754 or other means for establishing communications over the wide area network 752, such as the Internet. The modem 754, which may be internal or external, is connected to the system bus 723 via the serial port interface 746. In a networked environment, program modules depicted relative to the computing device 760, or portions thereof, may be stored in the remote memory storage device. It will be appreciated that the network connections shown are exemplary and other means of establishing a communications link between the computers may be used.

While it is envisioned that numerous embodiments of countermeasures for preventing disc drive counterfeiting are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for countermeasures for preventing disc drive counterfeiting, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing countermeasures for preventing disc drive counterfeiting.

The program(s) can be implemented in assembly or machine language, if desired. In any case, the language can be a compiled or interpreted language, and combined with hardware implementations. The methods and apparatuses for implementing countermeasures for preventing disc drive counterfeiting also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of countermeasures for preventing disc drive counterfeiting. Additionally, any storage techniques used in connection with countermeasures for preventing disc drive counterfeiting can invariably be a combination of hardware and software.

While countermeasures for preventing disc drive counterfeiting has been described in connection with the example embodiments of the various figures, it is to be understood that other similar embodiments can be used or modifications and additions can be made to the described embodiments for performing the same functions of countermeasures for preventing disc drive counterfeiting without deviating therefrom. Therefore, countermeasures for preventing disc drive counterfeiting as described herein should not be limited to any single embodiment, but rather should be construed in breadth and scope in accordance with the appended claims.

What is claimed:

1. A method comprising:
    parsing an authentication key into a plurality of parsed components;
    determining, from memory residing in a storage device, a respective memory location for storing each one of the plurality of parsed components;
    storing each one of the plurality of parsed components in a first set of distributed locations in the memory;
    storing disc drive software in a second set of distributed locations in the memory;
    storing random values in a third set of distributed locations in the memory, wherein the first, second, and third set of distributed locations in memory are interspersed with each other; and
    storing, in the memory, information on how to combine the plurality of parsed components for forming the authentication key.

2. A method in accordance with claim 1, wherein the random values comprise binary values.

3. A method in accordance with claim 1, wherein, for a plurality of disc drives, the first set of distributed locations for storing the plurality of parsed components of a respective authentication key differs for each one of the plurality of disc drives.

4. A method in accordance with claim 1, further comprising: obfuscating each one of the plurality of parsed components.

5. A method in accordance with claim 1, wherein the disc drive comprises a storage device of a game system.

6. A method in accordance with claim 1, wherein the information on how to combine the plurality of parsed components is embedded in a software program.

7. A method in accordance with claim 1, wherein the information on how to combine the plurality of parsed components comprises an identification of each location in the first set of distributed locations.

8. A method in accordance with claim 1, wherein the information on how to combine the plurality of parsed components is programmed into the disc drive at the time of manufacture of the disc drive.

9. A method in accordance with claim 1, wherein the disc drive software stored in the second set of distributed locations is utilized by the disc drive for at least one of a) accessing a storage medium or b) interfacing with a processor.

10. A processor configured to:
  parse an authentication key into a plurality of components;
  determine respective memory locations in memory residing in a storage device of a game system for storing each one of the plurality of components;
  store each one of the plurality of components in a first set of distributed locations in the memory;
  store disc drive software in a second set of distributed locations in the memory;
  store random values in a third set of distributed locations in the memory, wherein the first, second, and third set of distributed locations in memory are interspersed with each other; and
  store, in the memory, information on how to combine the plurality of components for forming the authentication key.

11. A processor in accordance with claim 10, wherein the random values comprise binary values.

12. A processor in accordance with claim 10, wherein the first set of distributed locations for storing the plurality of components of a respective authentication key for each one of a plurality of storage device differs from one storage device to another amongst the plurality of storage devices.

13. A processor in accordance with claim 10, further configured to: obfuscate each one of the plurality of components.

14. A processor in accordance with claim 10, wherein the storage device comprises an optical disc drive.

15. A computer-readable storage medium, the computer-readable storage medium not being a transient signal, the computer-readable storage medium having stored thereon computer-readable instructions for preventing counterfeiting of a storage device by performing the steps of:
  parsing an authentication key into a plurality of parsed components;
  determining, from memory residing in the storage device, respective memory locations for storing each one of the plurality of parsed components;
  storing each one of the plurality of parsed components in a first set of distributed locations in the memory;
  storing, in a second set of distributed locations in the memory, random values;
  storing, in a third set of distributed locations in the memory, storage device related software wherein the first, second, and third set of distributed locations in memory are interspersed with each other; and
  storing, in the memory, information on how to combine the plurality of parsed components for forming the authentication key.

16. A computer-readable storage medium in accordance with claim 15, wherein the random values comprise binary values.

17. A computer-readable storage medium in accordance with claim 15, wherein the first set of distributed locations for storing the plurality of components of a respective authentication key for each one of a plurality of storage device differs from one storage device to another amongst the plurality of storage devices.

18. A computer-readable storage medium in accordance with claim 15, further comprising computer-readable instructions for performing the steps of: obfuscating each one of the plurality of parsed components.

19. A computer-readable storage medium in accordance with claim 15, wherein the storage device comprises a storage device of a game system.

* * * * *